United States Patent
Rizzo

(10) Patent No.: US 8,417,707 B2
(45) Date of Patent: Apr. 9, 2013

(54) SYSTEM AND METHOD FOR SERVING SEARCH RESULTS OF TEXTUAL DATA IN RESPONSE TO A QUERY AS IT IS TYPED

(75) Inventor: John Rizzo, Palo Alto, CA (US)

(73) Assignee: PageBites, Inc., Palo Alto, CA (US)

( * ) Notice: Subject to any disclaimer, the term of this patent is extended or adjusted under 35 U.S.C. 154(b) by 149 days.

(21) Appl. No.: 12/974,403

(22) Filed: Dec. 21, 2010

(65) Prior Publication Data

US 2011/0161326 A1    Jun. 30, 2011

Related U.S. Application Data

(60) Provisional application No. 61/290,113, filed on Dec. 24, 2009.

(51) Int. Cl.
*G06F 7/00* (2006.01)
*G06F 17/30* (2006.01)

(52) U.S. Cl.
USPC .......................... 707/741; 707/769; 707/715

(58) Field of Classification Search .................. None
See application file for complete search history.

(56) References Cited

U.S. PATENT DOCUMENTS

| | | | |
|---|---|---|---|
| 6,711,569 B1 * | 3/2004 | Bushee | 1/1 |
| 6,772,141 B1 * | 8/2004 | Pratt et al. | 1/1 |
| 7,979,453 B2 * | 7/2011 | Jagannathan | 707/758 |
| 2005/0125440 A1 * | 6/2005 | Hirst | 707/103 R |

* cited by examiner

*Primary Examiner* — Uyen T. Le
(74) *Attorney, Agent, or Firm* — Edward C. Kwok; Hogan Lovells US LLP

(57) ABSTRACT

A system and a method provide in memory two level of indices to a data set, respectively referred to as an instance layer and an entry layer. The instance layer is brought from disk into memory when an application is initialized to allow insertion of new data into the data set. A temporary data structure augments the instance layer and is provided to keep track of the new data. When query processing is required, the entry layer is brought in, so that query processing may be achieved using both the instance layer indices and the entry layer indices. The temporary data is merged into the instance and entry layers and the data set is updated upon termination of the application or at predetermined times, whereupon the resulting data set and index layers are written out to disk.

15 Claims, 3 Drawing Sheets

SYSTEM AND METHOD FOR SERVING SEARCH RESULTS OF TEXTUAL DATA IN RESPONSE TO A QUERY AS IT IS TYPED

CROSS REFERENCE TO RELATED APPLICATIONS

The present invention relates to and claims priority of U.S. provisional patent application ("Provisional Application"), Ser. No. 61/290,113, entitled "SYSTEM AND METHOD FOR SERVING SEARCH RESULTS OF TEXTUAL DATA IN RESPONSE TO A QUERY AS IT IS TYPED," filed on Dec. 24, 2009. The Provisional Application is hereby incorporated by reference in its entirety.

BACKGROUND OF THE INVENTION

1. Field of the Invention

The present invention relates to a method and a system for performing a search on a textual data base. In particular, the present invention relates to searching a textual data base and presenting the search results to a query as it is typed.

2. Discussion of the Related Art

In many systems for searching public or personal data today (e.g., Google Suggest or Facebook Search), the user interface "suggests" a completion to a user query as the user types the query into a text box. In such systems, the suggestion is provided in the form of a list of possible queries that the user can select in lieu of typing out the remainder of the query. When the query is selected or completely typed out, the query is submitted to the search server which then returns the results of the search. In conventional systems (e.g., distributed systems such as BigTable, Cassandra and Sphinx), the search is performed on data which resides either in memory or on-disk. However, to date, there is no known system which performs a search in real time using the portion of the query already typed, and returns the actual search results responsive to that portion of the query. This is because such a capability is technically challenging, as it requires very fast searches on textual data. To implement such fast searches, it is preferred to avoid time-consuming disk accesses; however, such an approach would require keeping the data to be searched in memory, which is a very limited resource.

SUMMARY

According to one embodiment of the present invention, a system and a method provide in memory two level of indices to a data set, respectively referred to as an instance layer and an entry layer. The instance layer is brought from disk into memory when an application is initialized to allow insertion of new data into the data set. A temporary data structure augments the instance layer and is provided to keep track of the new data. When query processing is required, the entry layer is brought in, so that query processing may be achieved using both the instance layer indices and the entry layer indices. The temporary data is merged into the instance and entry layers and the data set is updated upon termination of the application or at predetermined times, whereupon the resulting data set and index layers are written out to disk.

The present invention is better understood upon consideration of the detailed description below in conjunction with the accompanying drawings.

DETAILED DESCRIPTION OF THE PREFERRED EMBODIMENTS

Figures 1, 2:
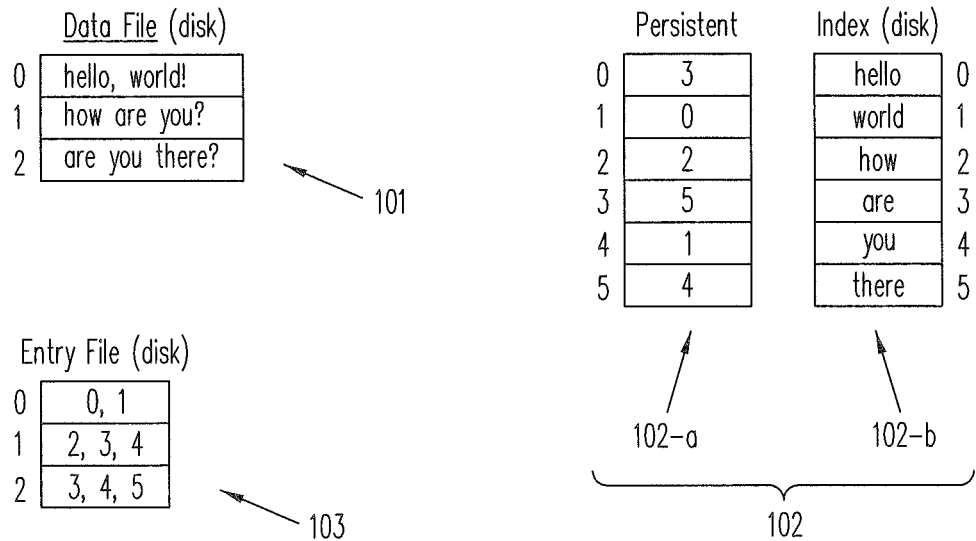
FIG. 1 shows data partition 100 on disk for a user who has previously sent three instant messages, in accordance with one embodiment of the present invention.
FIG. 2 shows kernel data 200, according to one embodiment of the present invention.

This invention provides a system and a method that uses a novel "in-cache database" technology to display real-time search results, as a query is typed. A system of the present invention requires keeping very little data in memory to perform updates on the database to be queried. When a query is processed, the system loads data into memory or unloads data from memory incrementally as needed. In one embodiment, in which personalized data is collected and queried, the present invention achieves high performance while requiring only relatively small amount of memory. In some systems, to provide a query result quickly, instead of performing a search, the system first searches in a cache of recent query results to determine if a search of the same or a similar query was recently performed. If so, the results from the recent search is returned. However, rather than looking for results from recent searches, a method according to the present invention performs an actual search of the relevant database to respond to the query.

In one embodiment, the system is designed in particular for use cases that search a natural language database. Such a system has the characteristics of frequent insertions into the database, but only occasional searches for query processing on a per-user basis, little or no updates, and very infrequent deletions from the database (typically, deletion requires little or no performance requirements). One application of such a system, for example, is a database of instant messages sent or received by a user. Initially, the user signs into a web application and performs some actions (e.g., exchanging instant messages with other users on the internet). In the course of exchange messages, the user may wish to perform a search on his instant message data for a particular phrase (or even disjoint phrase fragments). For that purpose, the web application provides a search box into which the user is allowed to enter a query. As the user types the query, a list of actual results is displayed in real time (rather than suggestions of possible queries, as in other systems (e.g., a Google Suggest server)). As the user types in additional letters of the query, the displayed search results are continually refined and narrowed. The list of actual results may be, for example, the instant messages the user sent or received that are responsive to the portion of the query typed. At any point in time, the user may select from the list a particular result to view its context (i.e., to view the conversation in which the message that is the selected search result appears, and the other party receiving or sending the message). If the search result itself is the information the user is seeking, the user may simply leave the search box and return to another activity.

Thus, the user is provided a method to very rapidly search through his instant message data, thereby saving seconds of time over conventional query-and-wait method of searching such data.

As mentioned above, a primary challenge to fast searches on a large amount of textual data is the effective use of limited memory resources. To overcome this challenge, a system according to one embodiment of the present invention provides an "in-cache" mechanism. In the following detailed description, a textual database of a user's instant messages is used to illustrate such a system, although the present invention is not so limited, being applicable to any search of any textual database.

In this embodiment, the search server associated with a web application keeps a table for each user. (Although the term "user" is used here as the criterion to create a partition or a boundary over the textual data to be searched, the "user" concept may be abstracted in another application to use another property as a criterion for partitioning the data to be searched). When the user is not using the web application, the user's data is stored entirely on disk.

For illustrative purpose, FIG. 1 shows data partition 100 on disk for a user who has previously sent three instant messages: "Hello, World!" "How are you?" and "Are you there?" As shown in FIG. 1, the instant messages are stored in order of issuance in section 101 of data partition 100 (i.e., "Hello, World!" "How are you?" and "Are you there?" are stored at positions 0, 1 and 2, respectively).

In section 102 of partition 100, a persistent index for the distinct words of the instant messages is provided. In this embodiment, the persistent index sorts the distinct words in alphabetical order. For example, column 102-b represents a list of the distinct words ("the distinct word list") in the order they appear in the instant messages, and column 102-a is a list of indices pointing to the distinct word list. The indices in column 102-a represent the words in the distinct word list sorted in alphabetical order. For example, at the top of the column (i.e., position 0, the alphabetically first distinct word) is the index "3", which points to position 3 of the distinct word list. Position 3 of the distinct word list corresponds to the word "are". Similarly, at the bottom of column 102-a (i.e., position 5, the alphabetically last distinct word) contains the index "4" which points to position 4 of the distinct word list. Position 4 of the distinct word list corresponds to the word "you".

In section 103 of partition 100, an entry file (or cross reference file) relates the instant messages of section 101 to the distinct word list of column 102-b. For example, position 0 of section 103 (corresponding to the instant message at position 0 of the section 101) contains indices "0" and "1," indicating the words "hello" and "world" are provided at positions 0 and 1 of the distinct word list of column 102-b. Similarly, position 2 of section 103 (corresponding to the instant message at position 2 of section 101) contains the indices "3", "4" and "5", indicating that the words "are", "you" and "well" are provided at positions 3, 4 and 5 of the distinct word list.

When the user signs into the web application, the search server loads the user's "kernel" data into memory. The kernel data is designed to be a very small amount (e.g., in the order of kilobytes even for fairly large data sets). The kernel data ensures that any new data entries are inserted and indexed properly in the search server; the kernel data is designed for fast insertion operations. FIG. 2 shows kernel data 200, according to one embodiment of the present invention. As shown in FIG. 2, kernel data 200 includes persistent index 201, which is a copy of the on-disk persistent index in section 101 of partition 100. In addition, kernel data 200 includes data file 202 and entry file 203, which are empty at the time the user first signs on the web application. Alternatively, loading of the kernel data may be deferred until a "query proximity" event, a "query expiration" event, or another specified event occurs; these events are described in detail below. By deferring loading of the kernel data to a later time, the demand on memory for the kernel data is restricted to a short time period, on the average.

Figure 3:
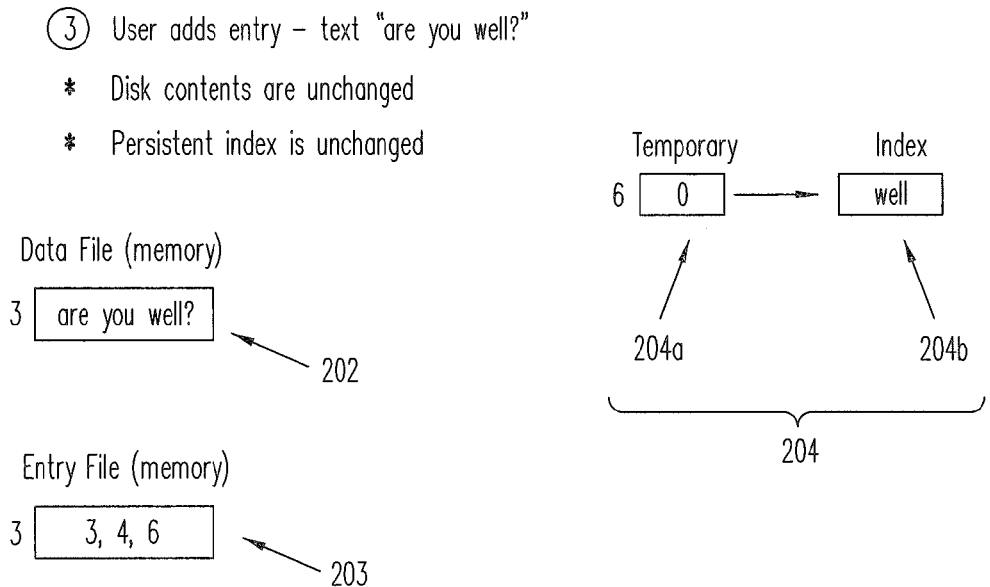
FIG. 3 shows changes in kernel data 200, after the user sends an instant message, in accordance with one embodiment of the present invention.

FIG. 3 shows changes in kernel data 200, after the user sends an instant message "Are you well"", in accordance with one embodiment of the present invention. As shown in FIG. 3, the search server stores the new instant message into data file 202. The new instant message is provided position label "3", indicating the new instant message is to be merged into the next position (i.e., position 3) of data file 101 of partition 100. At the same time, the search server finds that the words "are" and "you" at positions 3 and 4 in persistent index 201, and recognizes the word "well" to be a new distinct word. Accordingly, the search server creates temporary or "auxiliary" index 204, which is intended to be merged into persistent index 201 at a subsequent time. Columns 204-a and 204-b represent the indices to the alphabetically sorted new distinct word list and the new distinct word list, respectively. As shown in FIG. 3, the word "well" is entered into temporary index 204 and assigned a position label "6", indicating that the word "well" is to be appended to distinct word list of section 102 of partition 100 at position 6. Entry file 202 includes a new entry which indicates that the words "Are", "you" and "well" correspond to the words in the yet-to-be-merged distinct word list at positions 3, 4 and 6. If the loading of kernel data is deferred, a separate message queue keeps track of the necessary updates to the kernel data is kept. In the present embodiment, for example, the queue keeps tracks of a list of new messages. A queue threshold may be set, such that when the number of messages in the queue exceeds the queue threshold (i.e., a specified event), loading of kernel data is triggered. The queue threshold may be set to a reasonable value, balancing the memory requirement of the message queue to the memory requirement of the kernel data.

Figure 4:
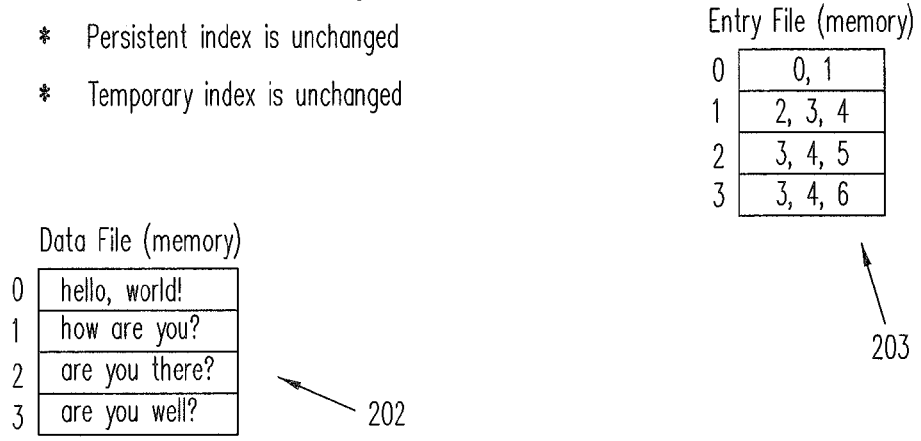
FIG. 4 shows additional data being loaded into memory in response to a query proximity event, in accordance with one embodiment of the present invention.

At a subsequent time during the web application session, the user may wish to query the data set. To indicate the intended search, the user may move, for example, a cursor to a search box. This operation is referred to as a "query proximity" event, as it signals to the search server that the user is likely to issue a query to initiate a search in the near future. If the kernel data have not been loaded, the kernel data is loaded at this time and may be modified according to the updates which are kept track of in the message queue in the manner described above with respect to FIG. 3. The occurrence of this query proximity event triggers loading of additional data from disk into memory. The amount of additional data to be loaded depends on the scope of the expected search. For example, in the present example, if the expected search is a "browse" of the instant messages, only the messages themselves need be loaded into memory. However, if a search for a phrase within the user's data is to be carried out, additional indexing data are loaded into memory. FIG. 4 shows additional data being loaded into memory in response to a query proximity event, in accordance with one embodiment of the present invention. As shown in FIG. 4, the data file from section 101 of partition 100 is loaded into data file 202 in memory, combining with the temporary data then existing in data file 202. Similarly, entry file 103 of partition 100 is loaded into entry file 203 in memory, combining with the data then existing in entry file 203. In one embodiment, because the user is more likely to search for recent messages that earlier messages, data file 202 may be structured to allow more recent data to be accessed before data relating to less recent times.

Therefore, the query proximity event is analogous to as a "cache miss", as data being sought is brought from the disk into the cache (memory) when required. With the data brought into memory, subsequent searches can be performed very quickly using conventional search techniques without requiring accesses to the disk. Such operations are therefore analogous to "cache hits." One search technique begins search by order the search term according to a heuristic based on the search terms' frequencies of occurrence. The search then proceeds looking for data corresponding to the least frequently occurring search terms.

Figure 5:
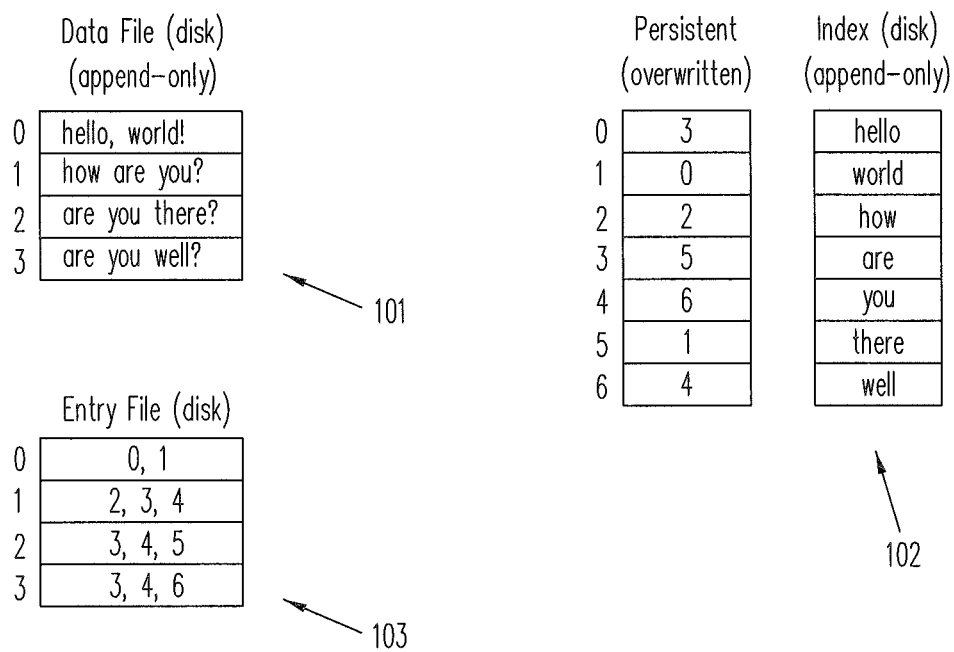
FIG. 5 shows the merged data on disk in the example of FIG. 4 after a cache expiration event, in accordance with one embodiment of the present invention.

Extending this metaphor, a "query expiration" event may occur. Such an event indicates to the search server that the likelihood of an additional search in the immediate future is minimal. For example, in the present example, a query expiration occurs when the user signs off from the instant message client. Upon a query expiration event, the temporary data collected in memory is "flushed" from memory onto disk. If the kernel data has not been loaded, the kernel data may be loaded at this time to be modified in the manner described above, if there is any necessary update to the kernel data tracked in the message queue. During the flush, the temporary data is merged into the data already on disk. As indicated above, the data merge operation may be achieved primary by appending the temporary data into the data on-disk, and thus can be performed very efficiently. Continuing the cache metaphor, a query expiration event generates an operation that is analogous to a cache write-back operation. In one embodiment, merging may be carried out when the temporary or auxiliary index reaches a certain size, or if the size of the auxiliary index exceeds the size of the persistent index. FIG. 5 shows the merged data on disk in the example of FIG. 4 after a cache expiration event, in accordance with one embodiment of the present invention.

In one embodiment, an index to sorted textual data (e.g., column 102-*a* of persistent index 101) may be implemented by a B+-tree or a similar data structure). The system of the present invention takes advantage of inherent properties of natural language to improve on such a scheme. In many natural languages, including some Eastern Asian languages, the lexicons are generally fairly small (i.e., requiring only a relatively small space in memory). In English, for example, the entire works of Shakespeare, who has arguably a more eclectic vocabulary than most works by others, contains only tens of thousands of English words. Additionally, the frequency of encountering a new word in a user's lexicon decreases with time as textual data for the user is being collected. Also, in English, most words are represented by a string of letters, with each letter encoded by a unique code. (The article "a" is an exception, being both a letter and a word). In some Asian languages, such as Chinese, each character that is encoded by a distinct code (e.g., unicode) may also be a distinct "word"; however, many frequently used terms may consist of two or more characters. Thus, the distinct word list in such languages may include both single character words and multiple character words. Thus, substantially the same algorithms for searching are equally applicable for search English or similar alphabetical European text and text in such Asian languages.

Taking the above observations into account, the present invention provides in the example above two index layers: an instance layer (e.g., the distinct word list, or "the user's lexicon"), and an entry layer (e.g., the entry file that relates messages to the distinct word list). The instance layer includes the persistent index and the temporary index. The persistent index is among the kernel data that is loaded early in the web application, while the entry layer and the raw data set is not loaded until it is likely to be needed (i.e., at a query proximity event). As the user adds data to the system, the data is tokenized and indexed in the temporary index. In one embodiment, the persistent index is always sorted, while the temporary index may be left unordered. At the occurrence of a query expiration event, the temporary index is merged into the persistent index, which is then flushed to the disk. Such an approach allows the entry layer to be an append-only list, which is very efficient for a small user lexicon, relative to the entire data set. As shown above, the main data file may also be implemented in an append-only fashion. Thus, at most a few hundred kilobytes of data are loaded from and written into disk each time the user uses the web application, except when the user issues a query, when the data set is then loaded to allow the search.

A search may be performed in two steps: (a) a binary or similar search matching entire words or their prefixes using the persistent index, and (b) an exhaustive search of the unsorted temporary index, which includes only the unmerged recent data entries. As discussed above, as the data dataset grows over time, the temporary index is expected to shrink. Such a search is expected to be very efficient (i.e., the aggregate execution time for a search under this approach is expected to be short). One further improvement is achieved by requiring the temporary index and the persistent index to be merged when the temporary index exceeds a predetermined size.

In some embodiments, multiple search servers are provided to provide, for example, load balancing. In some embodiments, multiple search servers are provided in a redundant manner, to avoid data loss and to ensure data integrity in the event of a loss of service in one of the search servers.

The above detailed description is intended to illustrate the specific embodiments of the present invention and is not intended to be limiting. Numerous modifications and applications within the scope of the present invention are possible. For example, the present invention is not only particularly effective in searching interactive instant messages, the present invention is equally applicable to such short messages as Twitter messages or SMS messages. The present invention is set forth in the appended claims.

I claim:

1. A method for providing a quick interactive search of textual data, comprising:

preparing a sorted index of distinct components of the textual data, the sorted index assigning a corresponding index to each of the distinct components, and storing the sorted index in a persistent storage medium;

using the corresponding indices in the sorted index, preparing a cross reference between portions of the textual data and the distinct components, and storing the cross reference in the persistent storage medium;

bringing the sorted index from the persistent storage medium into memory;

receiving an indication of a user's intention to search the textual data;

receiving from the user a query including search components; and in the course of receiving the user's query, as the search components are being received, matching the search components already received to the distinct components to obtain the corresponding indices from the sorted index and, using the corresponding indices and the cross reference, retrieving from the textual data the portions of textual data that includes the search components.

2. The method of claim 1, wherein the indication comprises an action by the user representing moving a cursor into a search box.

3. The method of claim 1, further comprising, upon receiving the indication, bringing into memory a portion of the cross reference from the persistent storage medium.

4. The method of claim 1, wherein the distinct components comprise distinct words in a vocabulary of one or more alphabetical languages.

5. The method of claim 1, wherein the distinct components comprise distinct strings of character encodings representing a vocabulary that includes one or more non-alphabetical languages.

6. The method of claim 1, wherein the portions of textual data comprise messages communicated between the user and one or more external sources.

7. The method of claim 6, further comprising:
receiving messages from one of the external sources; and
as the messages are received,
  preparing an auxiliary index for distinct components in the messages being received that are not already in the sorted index, and
  preparing an auxiliary cross reference between the distinct components in the auxiliary index with the components of the messages being received, wherein matching the search components further comprise matching the search components to the auxiliary index.

8. The method of claim 7 wherein, upon occurrence of a predetermined event, merging the sorted index with the auxiliary index and merging the cross reference with the auxiliary cross reference.

9. The method of claim 8, wherein the predetermined event occurs when at a termination of a user session.

10. The method of claim 8, wherein the predetermined event occurs in regular time intervals.

11. The method of claim 8, wherein the predetermined event occurs when the size of the auxiliary index exceeds the size of the sorted index.

12. The method of claim 1, wherein each distinct component in the sorted index is associated with a frequency of occurrence, and wherein the portions of textual data that includes the search components are retrieved in ascending order of frequencies of occurrences of the search components.

13. The method of claim 1, wherein the method is carried out in conjunction with a server managing the sorted index, the cross reference and the persistent storage medium.

14. The method of claim 13, wherein the server is one of a plurality of servers each assigned to a different set of users.

15. The method of claim 14, wherein memberships of the different sets of users are overlapping.

* * * * *